United States Patent
Koskan et al.

(10) Patent No.: US 10,867,219 B2
(45) Date of Patent: Dec. 15, 2020

(54) SYSTEM AND METHOD FOR INTELLIGENT TRAFFIC STOP CLASSIFIER LOADING

(71) Applicant: MOTOROLA SOLUTIONS, INC, Chicago, IL (US)

(72) Inventors: Patrick D. Koskan, Jupiter, FL (US); Alejandro G. Blanco, Fort Lauderdale, FL (US); Shervin Sabripour, Plantation, FL (US); Scott M Alazraki, Davie, FL (US); Daniel A. Tealdi, Plantation, FL (US); John B. Preston, Plantation, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 96 days.

(21) Appl. No.: 16/117,033

(22) Filed: Aug. 30, 2018

(65) Prior Publication Data
US 2020/0074245 A1 Mar. 5, 2020

(51) Int. Cl.
G06K 9/00 (2006.01)
G06K 9/62 (2006.01)
G08G 1/00 (2006.01)
G06F 40/174 (2020.01)

(52) U.S. Cl.
CPC ......... *G06K 9/6293* (2013.01); *G06F 40/174* (2020.01); *G06K 9/00469* (2013.01); *G06K 9/00664* (2013.01); *G08G 1/205* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,492,946 B2* | 2/2009 | Elder | .................... | G06F 40/171 382/187 |
| 8,742,934 B1* | 6/2014 | Sarpy, Sr. | .............. | G06Q 50/26 340/573.1 |
| 8,903,711 B2* | 12/2014 | Lundberg | ................ | G06F 40/58 704/8 |
| 9,218,634 B1* | 12/2015 | Sarpy, Sr. | ............... | H04W 4/90 |
| 9,386,050 B2* | 7/2016 | Oswald | ................... | G06Q 50/01 |
| 9,471,638 B2* | 10/2016 | Roytman | ............... | G06N 20/00 |
| 9,575,964 B2* | 2/2017 | Yadgar | ................ | H04M 3/4936 |
| 2004/0059582 A1* | 3/2004 | Kumhyr | ................... | G10L 15/30 704/275 |
| 2005/0279828 A1* | 12/2005 | Harper | ....................... | G09F 3/02 235/380 |
| 2006/0020630 A1* | 1/2006 | Stager | .................... | G06Q 50/26 |
| 2014/0118543 A1* | 5/2014 | Kerbs | .............. | G08B 13/19604 348/143 |
| 2014/0317052 A1* | 10/2014 | Goldstein | .............. | G06Q 50/26 707/609 |
| 2015/0040002 A1 | 2/2015 | Kannan et al. | | |
| 2018/0197052 A1* | 7/2018 | Yanson | .............. | G06K 19/0614 |

* cited by examiner

*Primary Examiner* — Tsung Yin Tsai

(57) ABSTRACT

Systems and methods for intelligent traffic stop classifier loading are provided. A processor may receive a plurality of inputs related to a current context of a law enforcement officer. Based on the plurality of inputs, it may be determined that the current context of the law enforcement officer is a vehicle traffic stop. An image classifier may be loaded onto an image capture device associated with the law enforcement officer based on the vehicle traffic stop determination. An object type associated with the image classifier may be scanned for using the image classifier loaded onto the image capture device.

20 Claims, 6 Drawing Sheets

SYSTEM AND METHOD FOR INTELLIGENT TRAFFIC STOP CLASSIFIER LOADING

BACKGROUND

First responders, such as police officers, are engaged in many different day to day tasks. One of those tasks may be conducting traffic stops. For example, a police officer may witness a driver of a vehicle commit an infraction of the motor vehicle code (e.g. speeding, improper lane usage, etc.) and may decide to conduct a traffic stop. It is widely known that conducting traffic stops is one of the most inherently dangerous activities in which first responders engage. At the outset of the traffic stop, the officer may have little or no information about the person operating the vehicle that is the subject of the traffic stop. The operator may be a generally law abiding person or may be a wanted fugitive. The unknown nature of the operator is one of the reasons traffic stops are inherently dangerous.

In a routine traffic stop there are general procedures that are followed. Although every agency may have specific procedures, generally an initial step in the procedure is notifying a dispatcher that a traffic stop is about to be performed. The driver may then be pulled over, generally by using the lights/sirens of the law enforcement officer's vehicle. Once the vehicle has pulled over, the law enforcement officer may exit his vehicle and approach the vehicle that is being stopped.

The law enforcement officer may request the identification (e.g. driver's license) of the driver of the vehicle that was stopped. The information from the identification may be sent to the dispatcher to run a background check on the driver (e.g. checking for outstanding warrants, etc.). If a citation is warranted (e.g. for some infraction of a traffic law) the law enforcement officer may retrieve a citation book and transcribe the identification information and infraction details onto the citation, which is then given to the driver.

The citation details are ultimately entered into an application/database in order to keep an electronic record of the citation. Although some agencies may have the ability to enter such information directly from the law enforcement officer's vehicle, in many cases the information is entered back at the law enforcement officer's station house or other fixed location.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
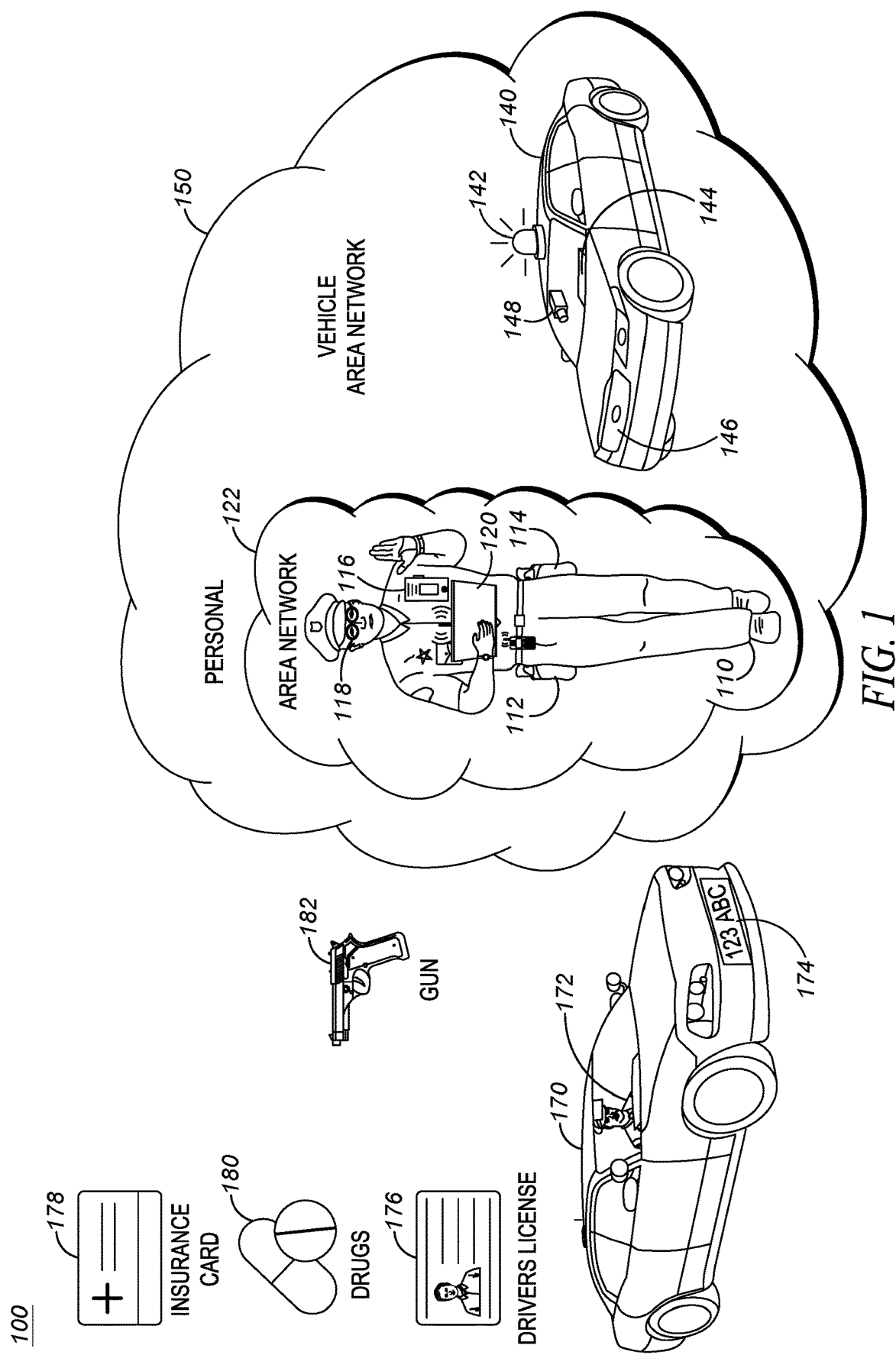
FIG. 1 is an example environment in which the intelligent traffic stop classifier loading techniques described herein may be used.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of maintaining safety is for an officer to always have a high level of situational awareness, meaning that the officer is aware of and observing his environment and any threats present in that environment. An adage that is often used is that the officer should, to the greatest extent possible, be "eyes up, hands free." Eyes up, meaning that the officer should always be observing his environment to detect possible threats as opposed to looking at other things (e.g. citation book, offender's driver's license, etc.). Hands free, meaning that the officer should have his hands available to respond to any threat as opposed to having his hands occupied with other things (e.g. holding onto an offender's driver's license, holding a pen/citation book).

Technology may be used to aid in an officer's ability to stay "eyes up, hands free." One example of such a technology is video based object classifiers. Many law enforcement vehicles are equipped with vehicle mounted cameras. More recently, more and more officers are being equipped with body worn cameras. Object classifiers, which can also be referred to as image classifiers, or just classifiers, are software applications that can analyze incoming video images, such as those produced by the officer's vehicle mounted or body worn camera, to identify a specific type of object in that video image. For example, a gun object classifier may be able to detect the presence of a gun in an incoming video stream. A driver's license classifier may be used to detect a driver's license object in a video stream and may also be able to extract data from the detected object (e.g. extract the name and address of a driver from the video image of the driver's license). By using an object classifier, the officer is better able to maintain an "eyes up, hands free" posture.

Object classifiers are designed to identify a specific type of object. For example, a gun object classifier may detect guns in a video image, but would not detect knives or other non-gun types of weapons. Similarly, a driver's license classifier may be able to detect driver's licenses, but might not be able to detect other forms of identification, such as a student ID. Although many different types of object classifiers are available, it is not feasible for every object classifier for all object types to constantly run on an officer's computing equipment.

First, the officer's local equipment, in order to remain portable, may have limited processing power in comparison to fixed systems. As such, the ability to run multiple object classifiers may be limited by the processing power of the officer's equipment. Second, the officer's computing equipment may be powered by batteries, meaning that the more intense the computing load, the shorter the battery life. Running many different object classifiers at all times may not be feasible as sufficient battery power may not be available. Running object classifiers remotely from the officer's equipment may be impractical as the bandwidth to transmit the video image stream in real time to a back end processor may not be available.

The techniques described herein provide systems and methods for intelligent traffic stop classifier loading. A plurality of inputs is used to determine the current context of an officer. If the context indicates that the officer is engaged in a traffic stop, traffic stop specific object classifiers may be loaded. As further input becomes available, more specific traffic stop related object classifiers may be loaded.

An example method includes receiving, by a processor, a plurality of inputs related to a current context of a law enforcement officer. The example method also includes determining, based on the plurality of inputs, that the current context of the law enforcement officer is a vehicle stop. Additionally, the method includes loading the image classifier onto an image capture device associated with the law enforcement officer based on the vehicle traffic stop determination. The method also includes scanning for an object type associated with the image classifier using the image classifier loaded onto the image capture device.

In one aspect of the example method, the plurality of inputs includes at least one of a vehicle state, a vehicle state change, a video analytic, an audio analytic, and ambient listening. In one aspect of the example method, the image classifier is a driver's license image classifier. The example method may also include loading a further refined image classifier. In an aspect of the example method, the further refined image classifier includes one of a state specific driver's license image classifier and a company specific insurance card image classifier.

In an aspect of the example method, the current context associated with the law enforcement officer is determined based on a sequence of the plurality of inputs. The example method may also include modifying the image capture device settings based on the image classifier that is loaded. The example method may also include using an ambient listening device to detect a cuing phrase. The method may also include loading an additional classifier based on the detection of the cuing phrase.

In an aspect the example method may include launching an application based on the context. The example method may also include populating fields in the application based on data extracted from the image classifier. In another aspect the example method may include extracting data from the image classifier. The method may also include performing a query based on the data extracted from the image classifier.

A non-transitory processor readable medium containing a set of instructions thereon that when executed by a processor cause the processor to implement the techniques described herein may be provided. The example medium may include instructions to cause the processor to receive a plurality of inputs, the plurality of inputs related to a current context of a law enforcement officer. The medium may include instructions to determine, based on the plurality of inputs, that the current context of the law enforcement officer is a vehicle traffic stop. The medium may also include instructions to load an image classifier onto an image capture device associated with the law enforcement officer based on the vehicle traffic stop determination. The medium may also include instructions to scan for an object type associated with the image classifier using the image classifier loaded onto the image capture device.

In one aspect, the medium may include instructions to modify the image capture device settings based on the image classifier that is loaded. In one aspect the medium may further include instructions to use an ambient listening device to detect a cuing phrase. The medium may also include instructions to load an additional classifier based on the detection of the cuing phrase.

In an aspect the medium may also include instructions to launch an application based on the context. The medium may include instructions to populate fields in the application based on data extracted from the image classifier. In one aspect the medium may also include instructions to extract data from the image classifier. The medium may further include instructions to perform a query based on the data extracted from the image classifier.

An example system is provided. The example system may include a processor and a memory coupled to the processor. The memory may contain a set of instructions thereon that when executed by the processor cause the processor to implement techniques described herein. The memory may include instructions to cause the processor to receive a plurality of inputs, the plurality of inputs related to a current context of a law enforcement officer. The memory may include instructions to determine, based on the plurality of inputs, that the current context of the law enforcement officer is a vehicle traffic stop. The memory may also include instructions to load an image classifier onto an image capture device associated with the law enforcement officer based on the vehicle traffic stop determination. The memory may also include instructions to scan for an object type associated with the image classifier using the image classifier loaded onto the image capture device.

In one aspect, the memory may include instructions to modify the image capture device settings based on the image classifier that is loaded. In one aspect the memory may further include instructions to use an ambient listening device to detect a cuing phrase. The memory may also include instructions to load an additional classifier based on the detection of the cuing phrase.

In an aspect the memory may also include instructions to launch an application based on the context. The memory may include instructions to populate fields in the application based on data extracted from the image classifier. In one aspect the memory may also include instructions to extract data from the image classifier. The memory may further include instructions to perform a query based on the data extracted from the image classifier.

FIG. 1 is an example environment in which the intelligent traffic stop classifier loading techniques described herein may be used. Environment 100 may include a law enforcement officer 110, a law enforcement officer vehicle 140, and a suspect vehicle 170.

Law enforcement officer 110, who may also be referred to simply as an officer, may be any person who is engaged in conducting vehicular traffic stops. Although it is most likely that officer 110 is a sworn law enforcement officer, the techniques described herein are not limited to any particular type of officer, and officer refers to anyone engaged in traffic stops, weather sworn or not. Officer 110 may carry any number of pieces of equipment on his person while engaging in a traffic stop. Examples of such equipment may be a weapon 112, such as a gun. In some cases, the holster for the weapon may include a sensor (not shown) that can be used to determine when the weapon has been removed from its holster (e.g. gun drawn detector).

The officer may also carry a communication device, such as a Land Mobile Radio (LMR) 114. Radio 114 may allow the officer to communicate with others, such as a dispatcher. The radio may include a microphone to pick up sounds near the officer. Although the radio includes a microphone, the officer may also carry a remote speaker microphone (RSM) (not shown) that allows the officer to use his radio without having to hold the radio transceiver unit in his hands. The radio may also include additional functionality, such as global positioning system (GPS) location capabilities. Although GPS capabilities may be included in radio 114, the officer may instead carry a standalone GPS system (not shown).

In addition to radio 114, the officer may also carry video image capture devices. For example, the officer may carry a body worn camera 116. The body worn camera may capture a field of view that is similar to the field of view seen by the officer. Body worn camera 116 may also include a microphone that is able to pick up sounds around the officer. Another form of video capture device may be a head mounted display 118 (HMD) that incorporates a display, a video camera, and a microphone. Visual information may be provided to the officer through the displays of the HMD 118, while the video camera captures images from the officer's field of view and the microphone captures audio near the officer.

In addition, officer 110 may carry any number of other devices 120. Such devices may include devices such as standalone video cameras, audio recorders, cell phones, laptop computers, tablet computers, etc. These devices may be capable of capturing audio and video. Although certain specific devices have been mentioned, it should be understood than the techniques described herein are not limited to any particular device or combination of devices.

In some cases, some or all, of the devices carried by officer 110 may be coupled to each other through the use of a personal area network (PAN) 122. For example, the personal area network may be a Bluetooth network, a WiFi network, or any other type of network that is established for communication between devices carried by the officer. The PAN may also be connected to other networks as described below. The PAN may allow inputs from devices the officer is carrying (e.g. video images, audio, etc.) to be sent to other devices for further processing, as will be described in more detail below.

Officer 110 may travel in vehicle 140. For example, vehicle 140 may be a police car. Vehicle 140 may be equipped with any number of devices. For example, vehicle 140 may include light/siren bar 142. When activated, light/siren bar may be used to signal to another driver that he is to pull over to the side of the road in order for the officer to conduct a traffic stop. Vehicle 140 may also be equipped with a radar gun 144 that allows the officer to determine the speed of a vehicle in order to determine if the vehicle is traveling above a posted speed limit, which may be cause for a traffic stop. Vehicle 140 may also include an automatic license plate reader (ALPR) 146 which may be used to automatically read the license plates of vehicles around the officer's vehicle and to determine if any of those vehicles should be stopped (e.g. ALPR detects license plate of vehicle reported as stolen).

Vehicle 140 may also include a vehicle mounted camera 148. Vehicle mounted camera 148 may be forward facing, and can record images in front of vehicle 140. Vehicle mounted camera 148 may also include additional capabilities, such as the ability to record images to the sides and rear of vehicle 140. In addition, vehicle mounted camera 148 may include a microphone to capture audio in the vicinity of the vehicle.

Vehicle 140 may also include any number of other devices. For example, a vehicle mounted GPS, a radio repeater, etc. (not shown). In addition, vehicle 140 may include any number of vehicle sensors (not shown). Some examples of sensors can include gear sensor (e.g. park/drive/reverse), door sensors (open/closed), driver in vehicle sensors (present/not present), vehicle speed sensor, etc. These sensors, in combination with the devices described above, may be utilized to determine the current state of the vehicle.

Some or all of vehicle 140 devices and sensors described above may be coupled through the use of a vehicle area network (VAN) 150. A VAN may be a network, such as, for example, a Wi-Fi or Bluetooth network, that allows the devices and sensors described above to communicate. In addition, PAN 122 may also be coupled to VAN 150. As such, all status information from the devices associated with the officer, the devices associated with the vehicle, and any sensors on the vehicle may be used as inputs to determine if an officer is currently engaged in a traffic stop or some other activity, and cause appropriate image classifiers to be loaded as needed.

Environment 100 may also include any number of other vehicles. For ease of description, only a single vehicle 170, which may also be referred to as the suspect vehicle, is shown. Vehicle 170 may include a driver 172, who may also be referred to as a suspect, driver, or vehicle operator. Driver 172 may be a person who is current in control of vehicle 170. Vehicle 170 may also include a license plate 174. License plate 174 may allow identification of certain information related to the vehicle. For example, the license plate may be used to determine the vehicle owner, the owner's address, the registered make, model, color, and vehicle identification number (VIN) of the vehicle, and any other information required to register a vehicle for lawful operation.

Driver 172 may carry identification information, such as a driver's license 176. A driver's license, in addition to ensuring that the driver is qualified to operate a vehicle, may also include driver identification information, such as name, address, date of birth. In general, each issuing jurisdiction (i.e. each state) may use a different format for driver's licenses, thus resulting is state specific driver's licenses. Driver 172 may also carry an insurance card 178 to prove that the driver has liability insurance in case of a vehicle accident. Many jurisdictions require drivers to have liability insurance and carry proof of having liability insurance. Just as with state specific driver's licenses, every insurance company may have their own format of insurance card, resulting in company specific insurance cards.

Driver 172 may also be carrying items that may be of concern to an officer. For example, driver 172 may be carrying (or contained within the vehicle) illegal drugs 180. In some cases, a traffic stop may be initiated based on an infraction of the vehicle code, but then results in discovery of illegal drugs. As another example, the driver may be carrying (or contained in the vehicle) a weapon, such as a gun 182. Although it may not necessarily be illegal for driver 172 to be carrying gun 182, it may still be beneficial for an officer conducting a traffic stop to be aware that a weapon is present.

In operation, inputs from all of the devices and sensors associated with the officer and the officer's vehicle may be monitored to determine the current context of the officer. The context of an officer generally refers to the activity the officer is currently engaging in. If the officer is currently patrolling his assigned coverage area, his context may be referred to as patrolling. If he is engaged in a vehicle chase of a suspect, his context may be vehicle chase. If he is engaging in a foot chase, his context may be foot chase. Yet another context of interest may be a traffic stop context. As mentioned above, image classifiers may be loaded based on the officer's current context.

Inputs to the context determination can include the state of the officer's vehicle (e.g. park/drive, lights/siren on/off, officer inside/outside vehicle, door open/closed, etc.). For example, if the officer vehicle is currently in drive, and the lights and sirens are not on, it is not likely the officer is engaged in a traffic stop. Whereas, if the officer's vehicle is in park, with the lights on, but siren off, and the officer is not in the vehicle, the likelihood the officer is engaged in a traffic stop is increased.

Video analytics may also play a part in determining the officer context. For example, video images captured from the vehicle mounted camera, body worn camera, or head mounted display may be analyzed to provide input into the context determination. For example, a video analytic may be used to determine if there is a car within 50 feet in front of the officer's vehicle that is not moving. In addition, audio analytics may be used as an input in determining an officer's context. For example, as mentioned above, in many cases one of the initial steps in performing a traffic stop is notifying a dispatcher. The audio input from one of the microphones associated with the officer may be monitored by an audio analytics application to perform natural language processing of the conversation between the officer and the dispatcher to infer the officer's context. Based on the audio analytic, it may be determined that the officer is likely to be engaged in a traffic stop.

In addition, a sequence of inputs may be used to determine an officer's current context. For example, video analytics may be used with the vehicle mounted camera to detect aggressive driving by a suspect vehicle. This may be followed by unexpected driving by the officer (e.g. U-turn to follow suspect driver, deviation from assigned patrol route to follow suspect driver), which is then followed by activation of the lights/siren, which is then followed by deactivation of siren, with lights still on, vehicle in park, and stationary vehicle within 50 feet in front of the officer's vehicle. This sequence of events may likely indicate that the officer viewed an activity necessitating a traffic stop, drove aggressively to get behind suspected offender, turned on lights and siren until vehicle stopped, at which point siren is turned off, officer vehicle is then placed in park and there is a non-moving suspect vehicle within 50 feet of the front of the officer's vehicle. Use of a sequence of events to determine context is described in further detail with respect to FIG. 3.

If it is determined that the officer's context is a traffic stop, traffic stop associated classifiers may be loaded to be used on images captured by an image capture device. For example, a driver's license classifier may be loaded to detect driver's license objects within the field of view of the image capture device. The officer may approach the driver that is being stopped and ask for his driver's license. The driver may present his driver's license within the field of view of the image capture device, which is scanning for driver's license objects, thus allowing the image capture device to identify the driver's license object. In some cases, the officer may not need to actually hold onto the driver's license (thus enabling "hands free"). Even if the officer does hold onto the driver's license, he need not take his eyes of the driver (thus enabling "eyes up").

In an example implementation, the driver's license classifier may be able to determine the specific state that issued the driver's license and may then cause a state specific driver's license image classifier to be loaded. In another example implementation, an ALPR on the officer's vehicle may determine the state that issued the license plate and may assume the driver is from the same state, and as such load a state specific driver's license classifier. In another example implementation, a state specific driver's license classifier may be loaded for the state the officer is currently in, assuming that most people driving within a state have a driver's license form that state. If either assumption turns out to be wrong, a more generalized classifier may be loaded.

In some cases, ambient listening may be used to determine when a specific classifier, such as a driver's license classifier should be loaded. When utilizing ambient listening, the officer's audio (from one of the officer associated microphones) may be monitored for a specific cuing phrase. For example, once it is determined that an officer's current context is a traffic stop, weapon detection and/or drug detection classifiers may be loaded. The weapon/drug detection classifiers may monitor the video image to detect the presence of any weapons and/or drugs (and may notify the officer if any are detected).

As the officer approaches the driver, he may speak the cueing phrase, "driver's license please," which may cause a driver's license classifier to be loaded. Depending on the capabilities of the officer's processing device, the weapons/drugs detection classifier may need to be unloaded. If a driver's license is detected by the image classifier, relevant data may be extracted. For example, name, date of birth, address. That information may be transferred through the PAN/VAN to an application, such as a citation writing application, in order for the information to be transcribed, automatically, to the citation.

In addition to the driver's license classifiers, insurance card and company specific insurance card classifiers may be loaded to capture insurance information, which again may be transcribed, automatically, to an application.

In some cases, image capture device settings may be modified based on the type of classifier that is loaded. For example, when searching for weapons, the most appropriate camera to use may be the vehicle mounted camera, which has a wide field of view. Thus, when the weapons detection classifier is loaded, the image source may be the vehicle mounted camera in normal mode. When looking for a driver's license object, the most appropriate camera may be the body worn camera with the lens macro mode engaged. Thus, the specific classifier loaded may determine the image capture device to use as well as the settings for that image capture device.

Figure 2:
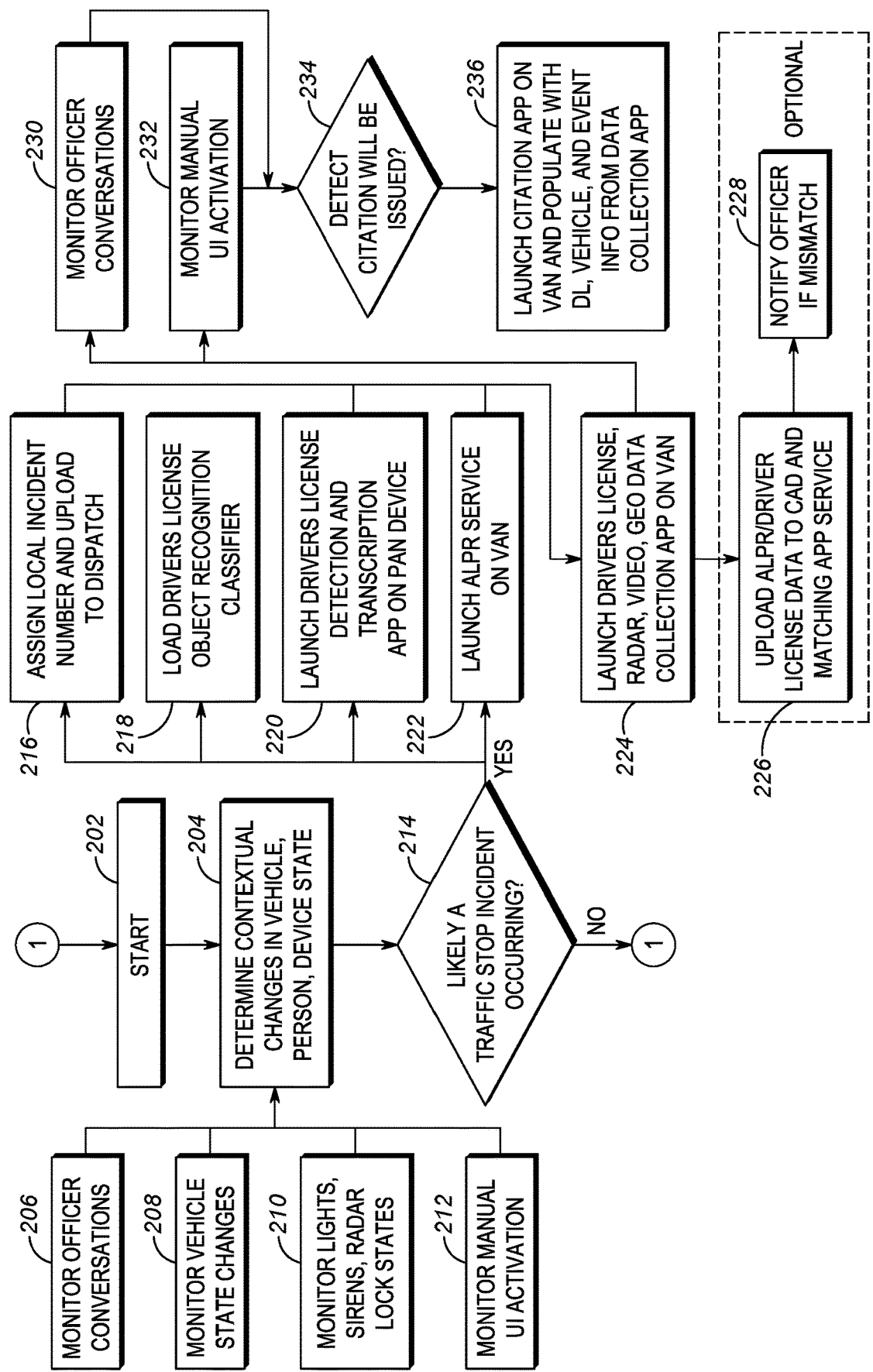
FIG. 2 is an example flow diagram of the process for intelligent traffic stop classifier loading that may be used in the environment described in FIG. 1.

FIG. 2 is an example flow diagram of the process for intelligent traffic stop classifier loading that may be used in the environment described in FIG. 1. The process may start in block 202. In block 204, contextual changes in vehicle, person, and device state may be determined based on monitoring a plurality of inputs. For example, one of those inputs is depicted in block 206 in which officer conversations are monitored. For example, the officer may be wearing one or more devices (e.g. LMR radio, body camera) that may include a microphone. Audio received through the microphone may be monitored to gather information about the officer's current context. For example, the audio may be monitored for a specified cueing phrase, such as "license and registration please." The audio may also be monitored using an audio analytic that may determine the officer's context through natural language processing.

Block 208 depicts another input that may be monitored. The officer's vehicle may contain sensors that can be used to determine changes in the vehicle state. For example, the vehicle may be shifted from drive into park. As another example, the vehicle state may change from a high rate of speed to a low or stopped rate of speed. Changes in vehicle state may be used to aid in determining the officer's current context. A state diagram for determining changes in vehicle state is described in further detail with respect to FIG. 3.

As yet another input, the lights, sirens, and radar lock state of the officer's vehicle may be monitored, as shown in block 210. An analysis of the state of various pieces of equipment on the officer's vehicle may provide an indication of the officer's context. For example, activation of the lights and siren, followed by the vehicle stopping, deactivation of the siren, but the lights remaining active, may be indicative of a traffic stop occurring. An additional input that may be used to determine an officer's context may be a manual interaction with a user interface (UI). As shown in block 212, the officer may use a manual UI interaction to indicate that the officer is engaging in a traffic stop.

In block 214, it may be determined if a traffic stop incident is likely occurring. In other words, based on the plurality of inputs, such as those described with respect to block 206-212, it may be determined if a traffic stop incident is likely occurring. If not, the process may return to the start at block 202, wherein the inputs continue to be monitored.

If it is determined in block 214 that a traffic stop incident is likely occurring, the process may move to blocks 216-222. In block 216, a local incident number may be assigned, and the number uploaded to a dispatcher in accordance to local agency policies. In block 218, a driver's license object recognition classifier may be loaded onto a device associated with the officer conducting the traffic stop. For example, the classifier may be loaded onto the officer body worn camera. As mentioned above, a driver's license object classifier may be a classifier that is designed to detect driver's license objects in a video image stream.

In block 220, a driver's license detection and transcription app may be launched on a PAN or VAN device associated with the officer. For example, the app may be used to extract information from a driver's license (e.g. name, date of birth, address, etc.) from an image of a driver's license captured by the driver's license object recognition classifier described in block 218.

In block 222, an automatic license plate recognition service may be launched on a devices associated with the VAN. For example, and ALPR system may be installed on the officer's vehicle. The ALPR system may be used to determine in which state the vehicle being pulled over is registered. This state specific information may then be used to cause a state specific driver's license object classifier to be loaded. A state specific driver's license classifier may be a classifier optimized to recognize the specific format of the driver's licenses issued by the specific state (e.g. in the state of Illinois, drivers licenses of persons under 21 are vertically oriented, while those of persons over 21 are horizontally oriented, a state specific object classifier may be aware of these orientation differences and be optimized accordingly).

In block 224, driver's license, radar, video, geo data collection apps may be launched on the VAN. For example, if a citation for speeding is going to be issued by the officer, identification information may be determined from the driver's license transcription app described in block 220. The speed information may be retrieved using the information gathered from the radar application. The location of the infraction may be gathered through the geolocation capabilities of the VAN.

In block 226, as an optional step, the ALPR and driver's license data may be uploaded to a computer aided dispatch (CAD) and matching app service to determine if the vehicle registration information matches the driver's license information. In the case where there is a mismatch, the officer may be informed of the mismatch in block 228.

In block 230 the officer's conversations can continue to be monitored. For example, the officer may issue a verbal indication that he is planning on issuing a citation. Likewise, in block 232 the officer's manual UI activation may be monitored to determine the officer's intended course of action. For example, launching a traffic citation app may indicate the officer intends to issue a citation.

In block 234, the monitoring of block 230 and 232 may continue to detect when the officer will issue a citation. If it is detected that the officer will issue a citation, the process moves to block 236. In block 236, a citation app may be launched on the VAN and populated with information, such as driver's license information, vehicle information, and event information that was previously captured using the object classifier, ALPR, geo location information, etc. In other words, the information necessary to issue a citation is automatically populated without requiring the officer to manually transcribe the information into a citation application and/or fill in the information in a paper citation book.

Figure 3:
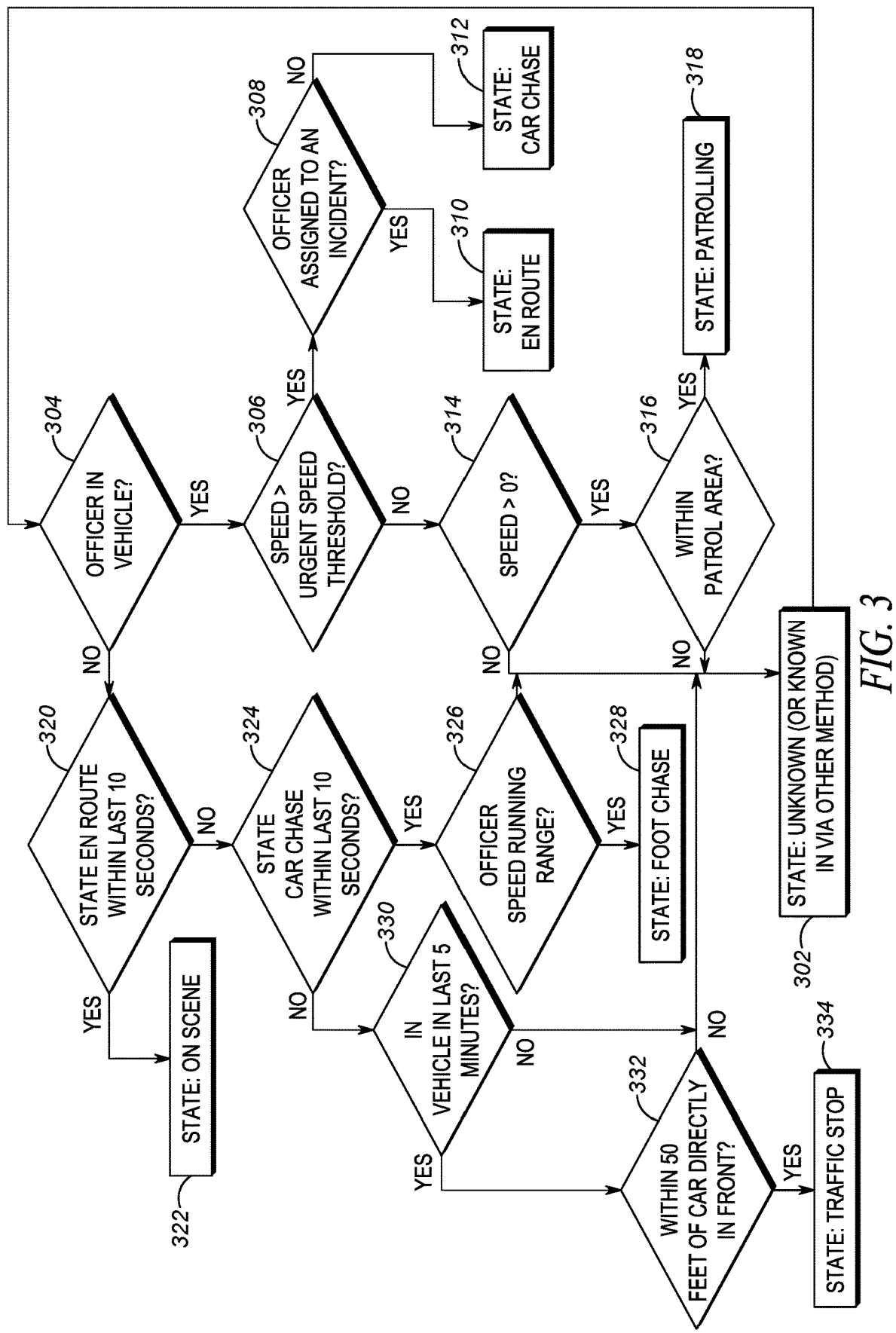
FIG. 3 is an example flow diagram illustrating a portion of a state diagram that may be used to determine if a law enforcement officer's context indicates he is engaging in a traffic stop, thus triggering the intelligent traffic stop classifier loading techniques described herein.

FIG. 3 is an example flow diagram illustrating a portion of a state diagram that may be used to determine if a law enforcement officer's context indicates he is engaging in a traffic stop, thus triggering the intelligent traffic stop classifier loading techniques described herein. The determined state indicates the officer's current context. It should be understood that FIG. 3 is not intended to represent a complete state diagram that may be used to determine an officer is engaged in a traffic stop. Instead, FIG. 3 should be used as an example of using a plurality of different input types in order to determine that an officer is engaged in a traffic stop, or in some other activity. A person of skill in the art would understand that the state diagram could be expanded as additional inputs are added.

In block 302, the state of the officer may initially be unknown. In some cases, the state of the officer may be known through other means. For example, the officer may manually enter his state into the device that is implementing the techniques described herein. In block 304, it may be determined if the officer is in his vehicle. This information may be provided by a sensor associated with the vehicle. For example, a sensor can determine if there is a person sitting in the driver's seat of the vehicle, which would generally indicate that the officer is in the vehicle. An additional sensor may be on the door and may indicate if the driver's side door of the vehicle is open or closed. An indication of a person sitting in the driver's seat of the vehicle with a door sensor indicating the driver's side door is closed may indicate the officer is in the vehicle, in a driving position.

If the officer is in the vehicle, in block 306 it may be determined if the vehicle speed is greater than an urgent speed threshold. The vehicle's speedometer may be one example of a sensor used to determine the vehicle speed, although other sensors (e.g. global positioning system, etc.) may also be used. If the vehicle speed is above the urgent response speed threshold, this may indicate that the officer is engaged in an activity other than routine driving/patrolling.

If the vehicle speed is greater than the urgent speed threshold, in block 308 it may be determined if the officer is assigned to an incident. The input that may be used to determine if an officer is assigned to an incident may come from a computer aided dispatch (CAD) system. Generally, when an officer is dispatched to an incident, a dispatcher creates a record in a CAD system and assigns the officer to the record. If the officer is traveling above the urgent speed threshold and has been assigned to an incident, this may indicate the officer has a state of en route, as indicated in block 310. If the officer has not been assigned to an incident, the state may indicate that the officer state is currently in a car chase, as indicated in block 312. In both cases, it should be clear that because the vehicle is moving, the state cannot be the officer is conducting a traffic stop. It should be understood that object classifiers appropriate to the en route/car chase states may be loaded according to the techniques described herein.

If the vehicle speed is not greater than the urgent speed threshold, it may be determined if the vehicle speed is greater than zero in block 314. In other words, block 314 determines if the vehicle is moving or if it is stopped. If the vehicle is moving, it may be determined in block 316 if the vehicle is within the officer's assigned patrol area. In an example implementation, the input for determining where the vehicle is located may come from a vehicle associated GPS system, however it should be understood that other locationing techniques (e.g. personal GPS, dead reckoning etc.) could also be used. The vehicles current location could be compared to assigned patrol areas that may be stored in a CAD system to determine if the vehicle is currently in the assigned patrol area.

If it is determined that the vehicle is within the assigned patrol area, it may be determined in block 318 that the officer's current state is patrolling, which effectively means that his state cannot be conducting a traffic stop. As above, object classifiers appropriate to a patrolling state may be loaded. For example, object classifiers that are used to detect weapons may be loaded in order to detect people in the patrol area that are carrying weapons.

If the officer speed is not above zero (e.g. officer is sitting in a stationary vehicle) or if the officer is moving, but is not within his assigned patrol area, the officer's state may be unknown, as shown in block 302. The officer may be engaging in other activities (e.g. filling out paperwork, driving to court, etc.) but is not currently engaged in a traffic stop.

If it is determined in block 304 that the officer is not in his vehicle, block 320 may determine if the officers state was en route within the last 10 seconds. As shown in block 310, an officer may have a state of en-route if their vehicle is traveling above the urgent speed threshold and the officer has been assigned to an incident. If the officer was en route within the last 10 seconds (e.g. responding to an incident) and is now out of the vehicle (e.g. as determined by a sensor in the vehicle) this may indicate the officer's current state is on scene of the incident, as shown in block 322. As above, the officer's state is not conducting a traffic stop. Object classifiers suited to arrival on an incident scene may be loaded. For example, an object classifier that detects human faces may be loaded in order to identify all people who are currently near the incident scene.

If the officer was not en route within the last 10 seconds, it may be determined in block 324 if the officer's state was in a car chase within the last 10 seconds. As described in block 312, if an officer is moving above the urgent speed threshold but is not assigned to an incident, the officer may be in a car chase. If the officer had a state of in a car chase within the last 10 seconds, it may be determined in block 326 if the officer's speed is within a running range. For example, an officer worn GPS system may be used to determine the officer's current speed. If the officer's speed indicates he is within running speed range, the officer's current state may be in a foot chase, as indicated in block 328. Foot chase specific object classifiers may be loaded. For example, object classifiers to detect items being thrown (e.g. weapons, illegal substances, etc.) from a suspect being chased may be loaded. If the officer's speed is not within the running range, this may indicate the officer's state is unknown, as shown in block 302.

If the officer state did not indicate a car chase within the last 10 seconds, in block 330 it may be determined if the officer was in vehicle in the last 5 minutes. If the officer has not been within his vehicle in the last 5 minutes, the officer's state may be unknown, as shown in block 302. However, if the officer has been within his vehicle in the last 5 minutes, it may be determined in block 332 if the officer's vehicle is within 50 feet of a car directly in front of it. Determining that a vehicle is within 50 feet of the front of the officer's vehicle may be determined using a device, such as a vehicle mounted camera.

If the officer's vehicle does not have a vehicle within 50 feet in front of it, the officer's state may be unknown, as shown in block 302. However, if there is a vehicle within 50 feet of the front of the officer's vehicle, the officer's state may be engaged in a traffic stop. In other words, if the officer is not in his vehicle (as determined in block 304), has not been en route to an incident within the last 10 seconds (as determined in block 320), has not been in a car chase within the last 10 seconds (as determined in block 324), has been inside his vehicle within the last five minutes (as determined in block 330), and has a vehicle within 50 feet directly in front of the officer's vehicle (as determined in block 332), then the officer's state can be set to be engaged in a traffic stop as shown in block 334.

As mentioned above, FIG. 3 is intended to be an example of a flow diagram that may be used to determine an officer's state, and is not intended to be exhaustive. Additional inputs, other than vehicle speed, position, officer in vehicle status, CAD status, etc. have been contemplated. For example, the status of the officer's vehicles lights and sirens may be considered. Detection of cuing phrases (e.g. "license and registration please") may be considered. Communication with a dispatcher (e.g. notifying dispatcher that officer is leaving vehicle to conduct a traffic stop) may be considered. What should be understood is that any number of available inputs may be analyzed to determine if the combination of those inputs indicate the officer is engaged in a traffic stop. Once determined, traffic stop object classifiers may be intelligently loaded, according to the techniques described herein.

Figure 4:
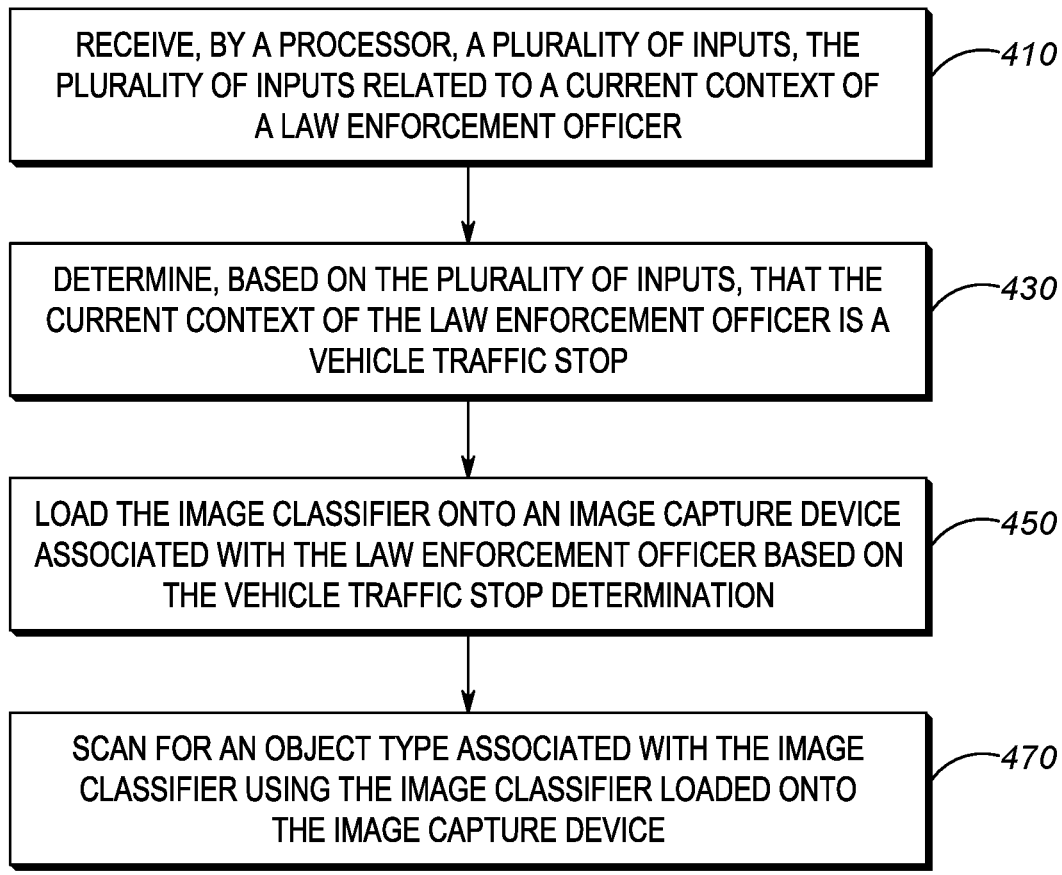
FIG. 4 is an example flow diagram describing intelligent traffic stop classifier loading using the techniques described herein.

FIG. 4 is an example flow diagram describing intelligent traffic stop classifier loading using the techniques described herein. In block 410, a processor may receive a plurality of inputs. The plurality of inputs may be related to a current context of a law enforcement officer. As mentioned above, the inputs may come from devices contained on the officer's person (e.g. body worn camera, personal GPS, microphone, etc.). The inputs may come from the state of the officer's vehicle (e.g. driver in/out of driver's seat, door open/closed, lights and siren on/off, vehicle in park/drive). The inputs may come from devices within the officer's vehicle (e.g. vehicle mounted camera, radar speed detector, ALPR, etc.). The inputs can also be the officer's current state, as defined by a CAD system. The plurality of inputs may be used to determine the officer's current context.

In block 430, it may be determined, based on the plurality of inputs, that the current context of the law enforcement officer is a vehicle traffic stop. As described above, combination of some or all of the plurality of inputs may allow for an inference to be made about the officer's current state. The plurality of inputs may be analyzed to determine if the current state of the officer is that he is engaging in a traffic stop.

In block 450, an image classifier may be loaded onto an image capture device associated with the law enforcement officer based on the vehicle traffic stop determination. For example, if the plurality of inputs indicate that an officer is currently engaged in a traffic stop, image classifiers related to a traffic stop (e.g. driver's license classifier, insurance card classifier) may be loaded on a device associated with the officer (e.g. body worn camera, vehicle mounted camera, etc.).

In block 470, the image classifier loaded onto the image capture device may be used to scan for an object type associated with the image classifier. For example, if the image classifier that is loaded is a driver's license object image classifier and is loaded on the officer's body worn camera, then the body worn camera may begin processing the video from the body worn camera to detect the presence of a driver's license within the field of view of the body work camera.

Figure 5:
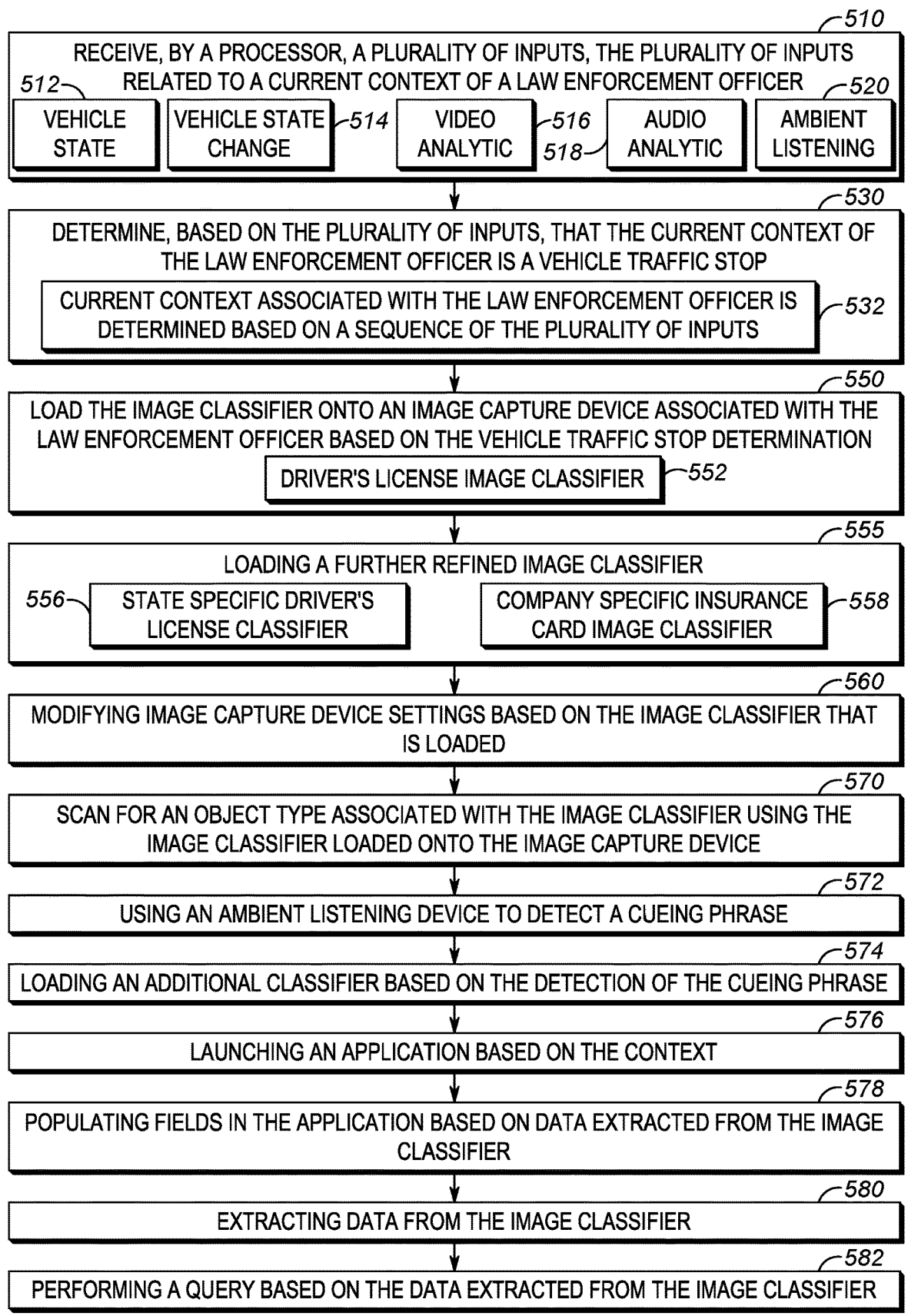
FIG. 5 is an example of a more detailed flow diagram describing intelligent traffic stop classifier loading using the techniques described herein.

FIG. 5 is an example of a more detailed flow diagram describing intelligent traffic stop classifier loading using the techniques described herein. In block 510, just as above in block 410, a processor may receive a plurality of inputs. The plurality of inputs may be related to a current context of a law enforcement officer. The plurality of inputs may include a vehicle state 512 (e.g. park/drive, lights and siren on/off, door open/closed, etc.). The plurality of inputs may also include vehicle state changes 514 (e.g. vehicle goes from high rate of speed to stopped, radar gun changes from scanning to locked, driver exiting vehicle). The plurality of inputs may include a video analytic 516 (e.g. ALPR, detecting stopped car within 50 feet of front of vehicle, monitoring aggressive driver behavior).

The plurality of inputs might also include an audio analytic 518. For example, an audio analytic may monitor communications to and from the officer to determine if the officer's context is a traffic stop. For example, radio communications could be monitored to detect, using natural language processing, speech that may be related to a car chase. For example, an instruction to chase or go after a car. As another example, an audio analytic may monitor the officer's communications using natural language processing to determine the officer's intentions (e.g. "Issuing speeding ticket").

The plurality of inputs may also include ambient listening input 520. With ambient listening inputs, the processor may be monitoring audio from the officer, for example through the microphone included on the officer's body worn camera or radio. Ambient listening may be used to monitor for specific commands. For example, an officer may say "License and registration please." Which could be a trigger to load traffic stop classifiers. It should be understood that audio analytics 518 determines context through natural language processing of the audio, while ambient listening determines context through identification of specific commands and/or queuing phrases.

In block 530, just as above in block 430, it may be determined, based on the plurality of inputs, that the current context of the law enforcement officer is a vehicle traffic stop. In some cases, the current context associated with the law enforcement officer may be determined based on a sequence of the plurality of events 532. For example, the officer's vehicle moving with lights and siren on, followed by the vehicle stopping with lights remaining on, but siren off, followed by officer getting out of the car, while there is a car stopped within 50 feet of the front of the officer's vehicle may indicate that officer is engaged in a traffic stop.

FIG. 4 is an example of a sequence of events determining if the officer's current state is a traffic stop, or some other state.

In block 550, just as in block 450, an image classifier may be loaded onto an image capture device associated with the law enforcement officer based on the vehicle traffic stop determination. As shown in block 552, in some cases, the image classifier may be a driver's license image classifier. As mentioned above, a driver's license image classifier may be used to detect an image of a driver's license that is within the field of view of the image capture device that is running the driver's license image classifier.

In block 555, a further refined image classifier may be loaded. For example, a state specific driver's license classifier 556 may be loaded. Each entity (e.g. state) that issues a driver's license may do so in a format that is specific to that entity. For example, driver's licenses from Illinois do not look the same as those from Florida. A state specific driver's license image classifier may be better able to identify, and extract data from, a driver's license from that state. In some cases, a non-state specific driver's license image classifier may first be loaded in order to identify the state that issued the driver's license. Once the state has been determined, the state specific image classifier may be loaded and used to identify state specific details in the driver's license, which may then be extracted and directly populated into other applications (e.g. ticket writing app).

Block 558 depicts another type of further refined classifier, the company specific insurance card image classifier. Just as each issuing entity (e.g. state) may issue slightly different forms of driver's license, insurance companies may issue slightly different forms of insurance cards. A company specific insurance card image classifier may be trained for a specific company's insurance card in order to locate and extract relevant information.

In block 560, settings of an image capture device may be modified based on the image classifier that is loaded. For example, an officer's body worn camera may normally be set to view as wide a field as possible in order to capture as much of the scene as possible. However, when running a driver's license image classifier, it is more important to have a clear view of objects that are closer to the camera lens. As such, switching the camera into macro mode may be useful when a driver's license image classifier is loaded.

In block 570, just as in block 470, the image classifier loaded onto the image capture device may be used to scan for an object type associated with the image classifier. In block 572, an ambient listening device may be used to detect a cueing phrase. For example, the ambient listening device may be the microphone on the officer's body worn camera or on his portable radio. Ambient listening may be used to detect specific phrases, such as "License and registration, please." An additional classifier 574 may be loaded based on detection of the cueing phrase. For example, the cueing phrase mentioned above may cause a driver's license image classifier to be loaded. In some cases, if additional information is available (e.g. the specific state of the driver's car obtained through the ALPR), then a state specific driver's license classifier may be loaded.

In block 576, an application may be launched based on the context. For example, in the case where an officer is writing a speeding ticket, a speeding ticket writing application may be launched, thus alleviating the officer from having to manually, with pen and citation book, issue the speeding ticket. In some cases, there may be different applications depending on the type of citation that is being issued. In other cases, there may be a single application, with the specific data required to complete the citation being dependent on the type of citation being issued.

In block 578 fields in the application may be populated based on data extracted from the image classifier. As mentioned above, the image classifiers may be used to detect specific objects within the field of view of an image capture device. Once detected, the image classifier, either alone or using additional software, may extract relevant fields of data from the object. For example, in the case of a driver's license image classifier, relevant information may include name, address, date of birth, etc. This is the type of information that is likely to be included on a citation. Specific data can be retrieved from the image classifier and populated into the citation form. In addition, data from other sources may also be populated in the citation form. For example, for a speeding ticket, information regarding the speed of the vehicle may be input into the application directly from the radar gun in the vehicle. Likewise, location information could be populated directly from the GPS of the officer or the officer's vehicle.

In block 580, data may be extracted from the image classifier. As explained above, an image classifier may be used to detect an object of interest in a video image. Once the object of interest is detected, data may be extracted from the identified object of interest. For example, in the case of a driver's license, a name may be extracted once a driver's license object is identified. In block 582, a query may be performed based on the data extracted from the image classifier. For example, if a name is extracted from a driver's license object, the name could then be used as an input to a database query to determine if there are any outstanding warrant for the named person.

Figure 6:
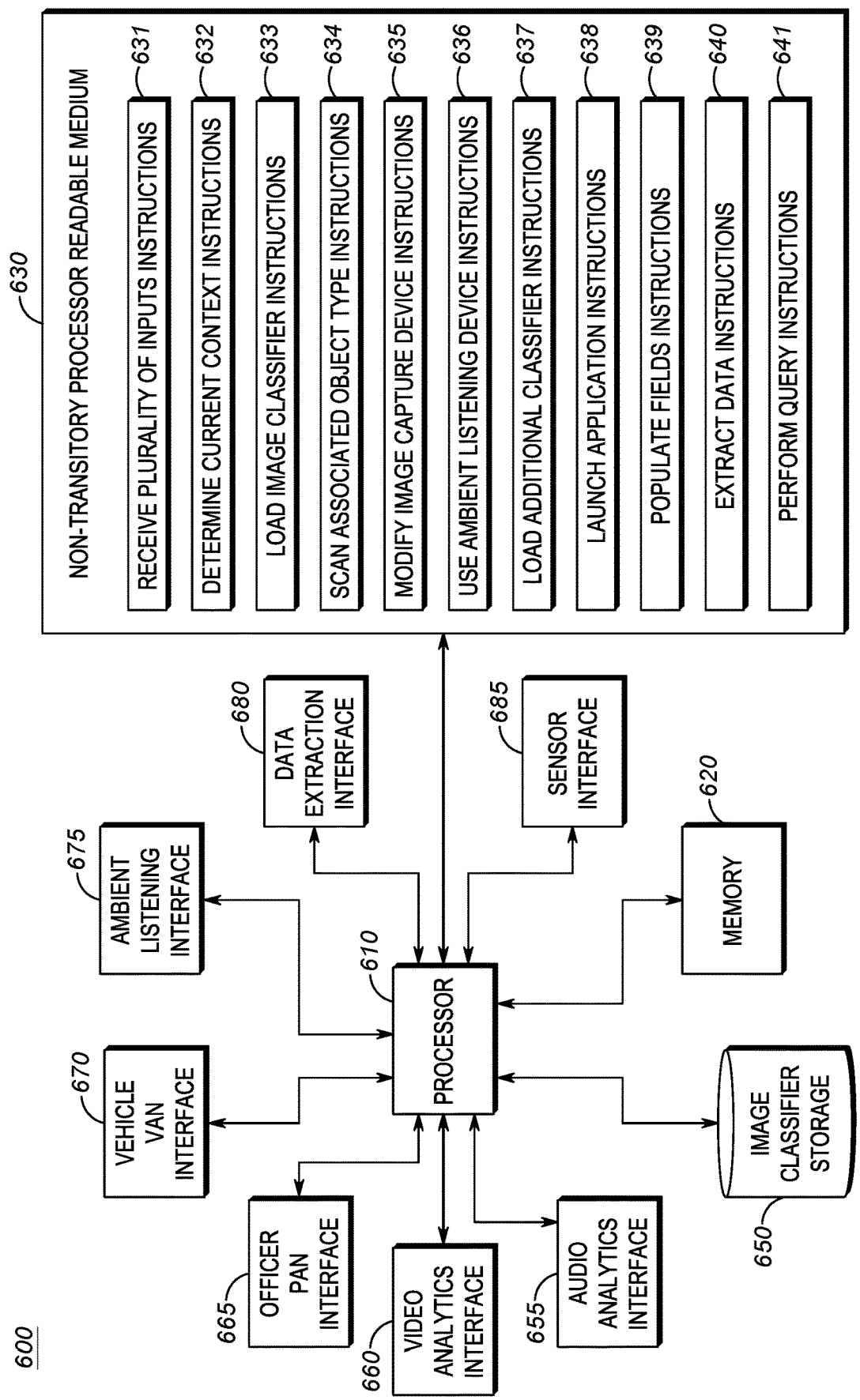
FIG. 6 is an example of a device that may be used with the intelligent traffic stop classifier loading techniques described herein.

FIG. 6 is an example of a device that may be used with the intelligent traffic stop classifier loading techniques described herein. Device 600 may include a processor 610. Coupled to processor may be a memory 620, and a non-transitory processor readable medium 630 containing a set of instructions thereon that when executed by the processor cause the processor to implement the intelligent traffic stop classifier loading techniques described herein. In some implementations, a copy of the instructions contained on medium 630 are loaded into memory 620 and executed by the processor 610 from the memory 620. In other implementations, the processor may access and execute instructions directly from medium 630. The contents of medium 630 are described in further detail below.

In addition, processor 610 may be coupled to image classifier storage 650, audio analytics interface 655, video analytics interface 660, officer personal area network interface 665, vehicle wide area network interface 670, ambient listening interface 675, data extraction interface 680, and sensor interface 685.

Image classifier storage 650 may contain various image classifiers. As mentioned above, some specific types of image classifiers may include driver's license image classifiers, state specific driver's license image classifiers, company specific insurance card image classifiers, weapons detection image classifiers, drug detection image classifiers, and any other type of image classifier that may be useful in a public safety application. Image classifiers stored in image classifier storage 650 may be loaded as needed. For example, when it is determined that an officer is engaged in a traffic stop, image classifiers associated with a traffic stop context may be retrieved from image classifier storage 650.

Audio analytics interface 655 may be used to receive input to monitor audio in the officer's environment to detect contextual information. For example, audio analytics interface may use the microphone connected to an officer's body worn camera or radio to receive audio in the officer's environment. This audio may be processed using natural language processing techniques to infer what is currently happening, for example, during a traffic stop. For example, if the office says he is issuing a speeding ticket, audio analytics interface may be used to determine that a traffic ticket, for the violation of speeding is about to be issued. The processor may load an image classifier, such as a driver's license image classifier, launch a traffic ticket writing application, and populate data within the application (e.g. name and address information from the driver's license image classifier can be automatically populated in the application).

Video analytics interface 660 may be used to interface with video capture devices associated with the officer. For example, a body worn camera or a vehicle mounted camera. As explained above, video analytics may be useful in determining the current context of an officer, such as the officer is currently engaging in a traffic stop. Video analytics may be used to determine that a vehicle is stopped within fifty feet of the front of the officer's vehicle. This input, along with others, may indicate a traffic stop context. As another example, video analytics may be used to detect aggressive or unexpected driving behavior, by either the officer or suspect, which may, in combination with other inputs, indicate a traffic stop context.

Officer PAN interface 665 may be used to access devices associated with the officer. As explained above, with respect to FIG. 1, many devices associated with an officer are interconnected through the use of a PAN. The Officer PAN interface 665 may be used to allow those devices to act as inputs to determine the officer's current context. Likewise, vehicle WAN interface 670 may be used to access devices associated with the officer's vehicle. As explained above with respect to FIG. 1, many devices associated with an officer's vehicle are interconnected through the use of a WAN. The vehicle WAN interface 670 may be used to allow those devices to act as inputs to determine the officer's current context.

Processor 610 may also be coupled to ambient listening interface 675. Ambient listening interface 675 may be coupled to audio devices associated with the officer. For example, the audio devices may be the microphone on the officer's body worn camera or radio. Ambient listening interface 675 may be used to detect defined cuing phrases in order to determine the officer's context. For example, detecting the phrase, "license and registration please," may indicate the officer is conducting a traffic stop. Unlike audio analytic interface 655, in which audio is used to infer the officer's context, ambient listening interface 675 is used to detect defined cueing phrases.

Data extraction interface 680 may be used to extract data to be used for other purposes. For example, a driver's license image classifier may be used to detect a driver's license within the field of view of an image capture device. Once detected, the image classifier may be used to identify data (e.g. name, address, date of birth) within the detected driver's license. This data may be extracted using data extraction interface 680. Another example of data extraction could be data extracted from a device such as a radar gun (e.g. speed, time of day, etc.). Data extraction interface may be used to extract such data for other uses. For example, the extracted data may be used to pre-populate the fields in a traffic citation. As yet another example, the extracted data may be used to perform a database query (e.g. an outstanding warrant database query based on a name extracted from a driver's license).

Sensor interface 685 may be used to receive inputs that may be indicative of the current context of the officer. For example, sensor interface 685 may be used to determine the state of the officer's vehicle (e.g. door open/closed, lights/siren on/off, etc.) It should be noted that in some cases, the sensors associated with the officer/officer's vehicle may be integrated with the PAN/VAN and as such, the inputs may be available through PAN interface 665 or VAN interface 670.

Non-transitory processor readable medium 630 may contain a set of instructions thereon. The instructions, that when executed by the processor, may cause the processor to implement the intelligent traffic stop classifier loading techniques described herein. For example, the medium may include receive plurality of inputs instructions 631. These instructions may be used by the processor to receive inputs that may be used to implement the techniques described. For example, the inputs may come from any of the interfaces described above.

The medium may also include determine current context instructions 632. As explained with reference to FIGS. 1-5, the current context may be determined based on the inputs. Determine current context instructions 632 may take the plurality of inputs and determine the current context. The medium may also include load image classifier instructions 633. As explained above, once the current context is known, context specific classifiers may be loaded. For example, if the current context is a traffic stop, traffic stop specific classifiers (e.g. driver's license image classifiers) may be loaded. The classifiers may have been stored in image classifier storage 650.

The medium may also include scan associated object type instructions 634. As explained above, once an image classifier is loaded, an incoming video stream may be scanned to detect objects that the image classifier is designed to detect. Scan instructions 634 may cause the incoming video images to be analyzed using the image classifier. The medium may also include modify image capture device instructions 635. As mentioned above, in some cases, an image classifier may work better with certain image capture device settings (e.g. setting the camera to macro mode when detecting close up objects). Modify instructions 635 may be used to modify the image capture device.

The medium may also include ambient listening device instructions 636. Ambient listening device instructions may allow the process to use a microphone associated with the officer (e.g. body cam or radio microphone) to be used to detect specific cueing phrases. The medium may also include load additional classifier instructions 637. In some cases, once certain information is determined, an additional classifier may be loaded using instructions 637. For example, once a driver's license classifier can determine which state issued a driver's license, a state specific driver's license image classifier may be loaded.

Launch application instructions 638 may be used to launch an application. For example, once it is determined that the current officer context is a traffic stop, and that the officer is going to be issuing a traffic citation, a traffic citation application may be launched using launch application instructions 638. The medium may also include populate fields instructions 639. Once an application is launched, populate field instructions 639 may be used to populate fields in the application. For example, if a traffic citation application is launched, populate fields instructions may be used to fill in details (e.g. driver's name, address, date of birth) on in the application.

The medium may also include extract data instructions 640. Extract data instructions 640 may be used to extract data from objects identified by image classifiers. For example, once a driver's license image classifier has detected a driver's license object, extract data instructions 640 may be used to extract fields (e.g. name, address, date of birth) from the detected driver's license object. The medium may also include perform query instructions. Once data fields have been extracted, perform query instructions 641 may be used to run a database query using the extracted data. For example, a name may be extracted from a driver's license and a query may be run in an outstanding warrants database using that name to determine if the driver has any outstanding warrants.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of loading an image classifier comprising:
   receiving, by a processor, a plurality of inputs, the plurality of inputs related to a current context of a law enforcement officer;
   determining, based on the plurality of inputs, that the current context of the law enforcement officer is a vehicle traffic stop;
   loading the image classifier onto an image capture device associated with the law enforcement officer based on the vehicle traffic stop determination; and
   scanning for an object type associated with the image classifier using the image classifier loaded onto the image capture device.

2. The method of claim 1 wherein the plurality of inputs includes at least one of: a vehicle state, a vehicle state change, a video analytic, an audio analytic, and ambient listening.

3. The method of claim 1 wherein the image classifier is a driver's license image classifier.

4. The method of claim 1 further comprising:
   loading a further refined image classifier.

5. The method of claim 4 wherein the further refined image classifier includes one of a state specific driver's license image classifier and a company specific insurance card image classifier.

6. The method of claim 1 wherein the current context associated with the law enforcement officer is determined based on a sequence of the plurality of inputs.

7. The method of claim 1 further comprising:
   modifying image capture device settings based on the image classifier that is loaded.

8. The method of claim 1 further comprising:
   using an ambient listening device to detect a cueing phrase; and
   loading an additional classifier based on the detection of the cueing phrase.

9. The method of claim 1 further comprising:
   launching an application based on the context; and
   populating fields in the application based on data extracted from the image classifier.

10. The method of claim 1 further comprising:
    extracting data from the image classifier; and
    performing a query based on the data extracted from the image classifier.

11. A non-transitory processor readable medium containing a set of instructions thereon that when executed by a processor cause the processor to:
    receive a plurality of inputs, the plurality of inputs related to a current context of a law enforcement officer;
    determine, based on the plurality of inputs, that the current context of the law enforcement officer is a vehicle traffic stop;
    load an image classifier onto an image capture device associated with the law enforcement officer based on the vehicle traffic stop determination; and
    scan for an object type associated with the image classifier using the image classifier loaded onto the image capture device.

12. The medium of claim 11 further comprising instructions to:
    modify image capture device settings based on the image classifier that is loaded.

13. The medium of claim 11 further comprising instructions to:
    use an ambient listening device to detect a cueing phrase; and
    load an additional classifier based on the detection of the cueing phrase.

14. The medium of claim 11 further comprising instructions to:
    launch an application based on the context; and
    populate fields in the application based on data extracted from the image classifier.

15. The medium of claim 11 further comprising instructions to:
  extract data from the image classifier; and
  perform a query based on the data extracted from the image classifier.

16. A system comprising:
  a processor; and
  a memory coupled to the processor, the memory containing a set of instructions thereon that when executed by the processor cause the processor to:
    receive a plurality of inputs, the plurality of inputs related to a current context of a law enforcement officer;
    determine, based on the plurality of inputs, that the current context of the law enforcement officer is a vehicle traffic stop;
    load an image classifier onto an image capture device associated with the law enforcement officer based on the vehicle traffic stop determination; and
    scanning for an object type associated with the image classifier using the image classifier loaded onto the image capture device.

17. The memory of claim 16 further comprising instructions to:
  modify image capture device settings based on the image classifier that is loaded.

18. The memory of claim 16 further comprising instructions to:
  use an ambient listening device to detect a cueing phrase; and
  load an additional classifier based on the detection of the cueing phrase.

19. The memory of claim 16 further comprising instructions to:
  launch an application based on the context; and
  populate fields in the application based on data extracted from the image classifier.

20. The memory of claim 16 further comprising instructions to:
  extract data from the image classifier; and
  perform a query based on the data extracted from the image classifier.

* * * * *